United States Patent
Reuschel et al.

(10) Patent No.: US 9,087,417 B2
(45) Date of Patent: Jul. 21, 2015

(54) WINDOW DEVICE WITH LIGHTING FOR A MOTOR VEHICLE

(75) Inventors: Jens Dietmar Reuschel, Ingolstadt (DE); Christoph Schmitz, Abensberg (DE); Johannes Tovar, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 14/005,511

(22) PCT Filed: Mar. 14, 2012

(86) PCT No.: PCT/EP2012/001130
§ 371 (c)(1),
(2), (4) Date: Sep. 16, 2013

(87) PCT Pub. No.: WO2012/123110
PCT Pub. Date: Sep. 20, 2012

(65) Prior Publication Data
US 2014/0002255 A1  Jan. 2, 2014

(30) Foreign Application Priority Data
Mar. 17, 2011   (DE) .......................... 10 2011 014 263

(51) Int. Cl.
*B60Q 1/00* (2006.01)
*G07C 5/00* (2006.01)
(Continued)

(52) U.S. Cl.
CPC . *G07C 5/00* (2013.01); *B60K 35/00* (2013.01); *B60Q 1/268* (2013.01); *B60Q 3/0213* (2013.01); *B60Q 9/008* (2013.01); *F21S 48/00* (2013.01); *F21S 48/20* (2013.01); *G02B 6/0095* (2013.01); *B60K 2350/203* (2013.01); *B60K 2350/2069* (2013.01); *B60K 2350/2091* (2013.01); *B60Y 2200/12* (2013.01); *G02B 6/006* (2013.01); *G02B 6/0068* (2013.01); *G02B 6/0076* (2013.01)

(58) Field of Classification Search
CPC ............................... G02B 6/0095; B60Q 1/268
USPC .............. 340/438, 485, 691.1, 691.6, 815.55, 340/815.73; 362/509
See application file for complete search history.

(56) References Cited

U.S. PATENT DOCUMENTS

| 4,892,369 A | 1/1990 | Moss |
| 8,808,839 B2 * | 8/2014 | Timmermann ............... 428/174 |

(Continued)

FOREIGN PATENT DOCUMENTS

| CN | 2778556 Y | 5/2006 |
| DE | 4211728 | 10/1993 |

(Continued)

OTHER PUBLICATIONS

International Search Report issued by the European Patent Office in International Application PCT/EP2012/001130.
(Continued)

*Primary Examiner* — Toan N Pham
(74) *Attorney, Agent, or Firm* — Henry M. Feiereisen LLC.

(57) ABSTRACT

A window device for a motor vehicle device has a transparent first pane including a first structure for coupling out light and a transparent second pane which is connected in parallel to the first pane. Moreover, the window device has an illumination device for coupling first light into the first pane. The second pane has a second structure for coupling out light. A second light can be coupled into the second pane independently of the first light by way of the illumination device.

11 Claims, 1 Drawing Sheet

(51) Int. Cl.
*B60K 35/00* (2006.01)
*B60Q 1/26* (2006.01)
*B60Q 3/02* (2006.01)
*B60Q 9/00* (2006.01)
*F21S 8/10* (2006.01)
*F21V 8/00* (2006.01)

(56) References Cited

U.S. PATENT DOCUMENTS

| | | |
|---|---|---|
| 2007/0115673 A1 | 5/2007 | Chen |
| 2008/0259623 A1 | 10/2008 | Spazier |
| 2012/0250341 A1 | 10/2012 | Reuschel et al. |
| 2012/0250342 A1 | 10/2012 | Reuschel et al. |
| 2013/0214915 A1 | 8/2013 | Nikol et al. |

FOREIGN PATENT DOCUMENTS

| | | |
|---|---|---|
| DE | 19852593 | 5/2000 |
| DE | 10147267 | 4/2003 |
| DE | 20306311 | 9/2004 |
| DE | 10313067 | 10/2004 |
| DE | 202004019881 | 5/2005 |
| DE | 202005001607 | 5/2005 |
| DE | 10360729 | 7/2005 |
| DE | 202005020510 | 6/2006 |
| DE | 202006006051 | 7/2006 |
| DE | 102006047887 | 5/2007 |
| DE | 1903359 | 3/2008 |
| DE | 102008004995 | 12/2008 |
| DE | 102008045447 | 3/2010 |
| DE | 102009010623 | 9/2010 |
| FR | 2738783 | 3/1997 |
| JP | 06-122343 | 5/1994 |
| JP | 2001105849 | 4/2001 |
| JP | 2002297070 | 10/2002 |

OTHER PUBLICATIONS

Chinese Search Report with respect to counterpart Chinese patent application 201280013217.5, Mar. 17, 2011.

Translation of Chinese Search Report with respect to counterpart Chinese patent application 201280013217.5, Mar. 17, 2011.

* cited by examiner

WINDOW DEVICE WITH LIGHTING FOR A MOTOR VEHICLE

CROSS-REFERENCES TO RELATED APPLICATIONS

This application is the U.S. National Stage of International Application No. PCT/EP2012/001130, filed Mar. 14, 2012, which designated the United States and has been published as International Publication No. WO 2012/123110 and which claims the priority of German Patent Application, Serial No. 10 2011 014 263.0, filed Mar. 17, 2011, pursuant to 35 U.S.C. 119(a)-(d).

BACKGROUND OF THE INVENTION

The present invention relates to a window device for a motor vehicle with a transparent first pane including a first structure for coupling out light, a transparent second pane which is connected in parallel with the first pane, and a lighting device for coupling light into the first pane. The present invention also relates to a driver assist system with such a window device and a motor vehicle with a driver assist system.

Vehicles have slidable panes with which windows in the vehicle body can be opened and closed. Whether a window is open or not cannot always be recognized at first sight. Therefore there is a need to more clearly indicate the opening state of the window to the vehicle occupants.

In addition, modern vehicles have numerous assist systems. On one hand the driver is to be supported when driving the vehicle (for example lane assist, takeover warning system, distance warning system) and on the other hand passengers can also be warned (for example they can be warned of a passing bicycle when exiting). These assist systems mostly provide visual indications or warnings. It is therefore important to provide these visual indications and warnings at sites which are located in the viewing direction of the passengers.

A window device of the generic type is known from the printed publication DE 103 13 067 A1. There, a vehicle roof with an adjustable nontransparent cover for selectively closing or releasing a roof opening is described. On the bottom side of the cover plate a transparent plate is fastened which can be illuminated at an edge by a light source and is configured so that light introduced at the edge exits by means of scattering or reflection toward the interior of the vehicle. For example, the light can be coupled out by means of indentations which were introduced into the screen by laser engraving. Also, lines or points or two-dimensional structures can be disposed on the screen for example by means of screen printing for coupling out the light. On the side of the plate which faces toward the interior of the vehicle a scatter screen is provided which is formed by a second thin screen and which is for example glued to or laminated with the plate.

From Patent DE 198 52 593 B4 a device for illuminating an interior space is known which device is configured as surface light. The light generated by a light source is coupled into the plate via a plate edge and is scattered at scatter sites in the plate into all directions.

Further, DE 10 2009 047 878 A1 shows a roof window for a motor vehicle which includes a light source for introducing light into the transparent wedge-shaped, essentially solid body.

A roof window with lighting is also described in the printed publication EP 1 903 359 A2. There, lighting means are arranged at the circumference of a layered screen.

Further, the printed publication DE 203 06 311 U1 discloses an arrangement for generating animated visual effects in partially transparent plastic screens. Surfaces of the screens are matted with a laser beam. Light is coupled in via the side surfaces. The arrangement can have multiple screens arranged on top of each other. By temporally varying illumination of the individual screens animated images are generated.

Finally, the printed publication DE 101 47 267 A1 discloses a braking light system for vehicles. A stream lighter shines a bundled light beam into the border of a rear window. The light beams are retained in the screen by total reflection. When the light beams encounter a region in the screen which causes a light diffraction or light reflection under a defined angle, the light beams leave the glass screen. Such light refractors can consist of multiple "intersecting lines" arranged in parallel and can be placed at a site, which is provided for braking lights.

SUMMARY OF THE INVENTION

It is an object of the present invention to better support an occupant of a vehicle with visual indications of an assist system.

According to the invention, this object is solved by a window device for a motor vehicle with
 a transparent first screen including a first structure for coupling out light,
 a transparent second screen which is connected in parallel with the first screen and
 a lighting device for coupling first light into the first window, wherein
 the second screen has a second structure for coupling out light, and
 a second light can be coupled into the second screen independent of the first light.

A structure for coupling out light in this context relates to any structure, which is introduced into a screen for coupling put light in a targeted manner (in particular by scattering).

Advantageously, the layer structure of a typical vehicle screen is thereby used for providing various items of information. On one hand the window border is made clearly recognizable. As a result, an occupant can more easily recognize whether a window is opened closed or partially opened. With the second screen a further item of visual information can then be provided because it has a coupling out structure in the interior region of the screen. When both screens have approximately the same shape, the items of information outputted by them can therefore be distinguished easily.

Preferably the first light can be coupled into a front side of the first screen and the second light into a front side of the second screen. This has the advantage that light due to the total reflection tends to remain in the screen before it impacts a corresponding scattering or coupling out structure.

It is also advantageous when the first light and the second light originate from two different light sources. This allows easily controlling the light sources independent of each other.

In an embodiment, the first structure for coupling out light is provided on at least one front side of the first screen. As a result, light is coupled out of the first screen at the front side i.e., at the border. This can be used to indicate to the occupants which position a slidable pane has assumed.

In a further embodiment the second structure is located in a region of the second screen which is different from the front sides of the second screen. The coupling out structure is thus located in an interior region of the screen so that practically the entire screen can be used for more or less large symbols as display surface.

The structures for coupling out light can be produced by adhesive attachment onto the respective screen, etching of the respective screen, laser treatment of the respective screen and/or sand blasting of the respective screen. In any case this influences the reflection or scattering of the light in or on the screen, which leads to a respective visual appearance at the location of these structures.

In a particularly preferred embodiment a foil is glued in between the two screens. With this, a laminated screen can be used for the visual display which offers a high safety standard.

Further, the second pane can be illuminated by the lighting device with a different intensity and/or a different color than the first screen. With this, items of information, which are provided by the first pane can be more easily distinguished by a passenger from the visual indications, which are provided by the second screen.

As mentioned above, it is especially advantageous when a driver assist system is provided with the described window device. With this a visual indication, in particular a warning of the driver assist system is generated by the window device. In this way, the surface of windows, which is otherwise not used for items of information can be used for visual indications.

BRIEF DESCRIPTION OF THE DRAWING

The invention is now explained in more detail by way of the included drawings which show in.

DETAILED DESCRIPTION OF PREFERRED EMBODIMENTS

Figure 1:
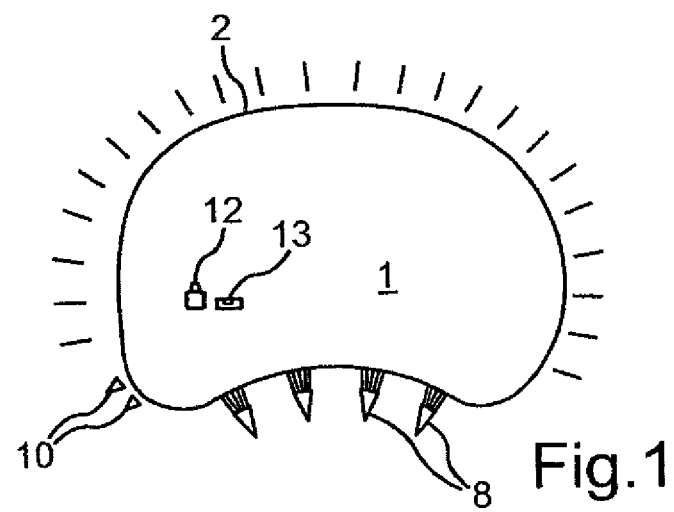
FIG. 1 a schematic view of a window device according to the present invention in the side view and FIG. 2 an oblique view of a section of the window device of FIG. 1.

The exemplary embodiments, which are explained in more detail in the following, represent preferred embodiments of the present invention A motor vehicle has for example a windowpane 1 which is shown in FIG. 1. This windowpane 1 is for example arranged in a side window of the motor vehicle. It is slidable i.e., it can be moved upwards and downwards or sideways in order to open or close the respective window.

The windowpane 1 has a border 2, which in the present document is also referred to as front side or front surface. While the pane 1 is normally fully transparent, the border is mostly partially transparent or scattering. The border 2 is produced for example by sand blasting so that it attains a typically milky appearance.

Figure 2:
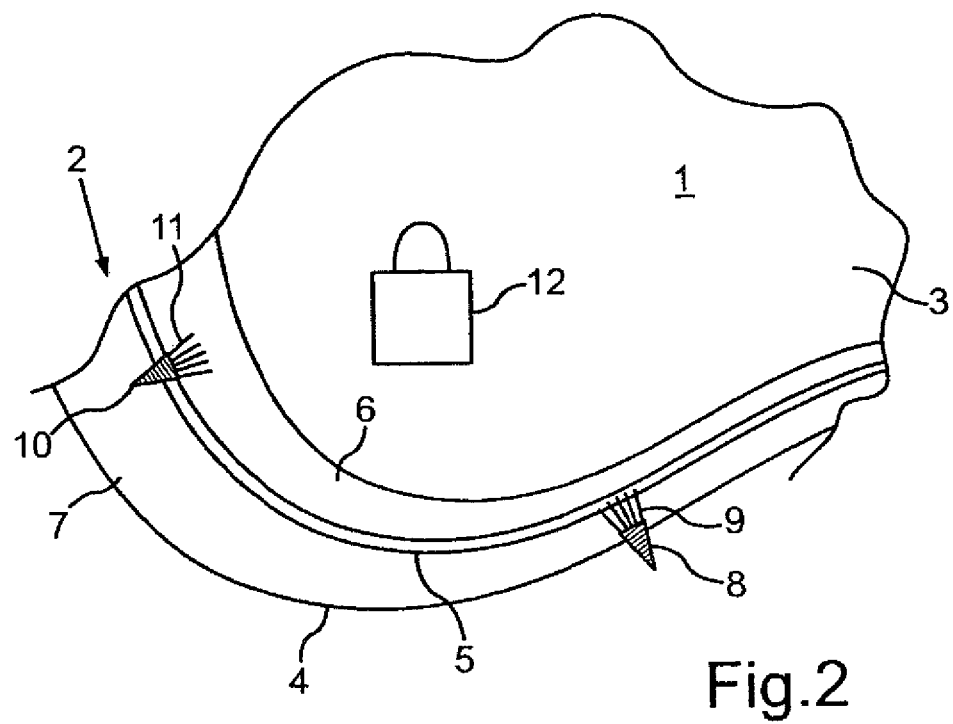

The windowpane 1 is a laminated glass pane. This means that the windowpane is made of two panes 3, 4, which are glued together by a foil 5. This is shown in FIG. 2, which shows an enlarged section of the windowpane of FIG. 1. In particular the structure of the border 2 is emphasized because there the front surface or the border 6 of the one pane 3 and the front side or the border 7 of the other pane can be recognized.

In the instant case both panes 3, 4 are of the same size, which however is not strictly required. Also the foil 5 in the instant case has an essentially same two-dimensional extent as the two panes 3, 4. The pane 3 for example faces the interior of the vehicle while the pane 4 faces outwardly.

Light 9 is coupled into the border 7 of the outer pane 4 with a lighting element 8, which is part of a lighting device. In the example of FIG. 1 the lighting device has multiple lighting elements 8 which couple light into the first pane at its border 7. The light 9 is conducted in the first pane 4 by total reflection up to the respectively opposite border section. If the border section of the border 7 is not fully transparent but is for example etched or sand blasted (=structure for coupling out light) a corresponding scattering results at this location so that a vehicle occupant can perceive the border 2 of the widow pane 1 as being illuminated. With this, the occupant can perceive at night or day without expending too much attention how far the window is opened or not. It is useful when the first light 9 is for example coupled into the windowpane 1 or the outer pane 4 from below. The lighting elements 8 are advantageously accommodated in the door of the motor vehicle.

The lit up border of the window pane 1 shows the delimitations of the window pane. This can generally reduce the risk of injury, which results during handling of slidable windows. In particular the risk can be reduced that a person hits his head at the window when the windows are moved down or in vehicles with frameless doors (for example cabriolets or coupes).

The second pane 3 of the windowpane 1 is illuminated by one or multiple lighting elements 10. These lighting elements 10 are also part of the lighting device. They couple a second light 11 into the border 6 of the second pane 3. This second light 11 serves for illuminating a second structure inside the second pane 3. The second structure is for example one or more symbols 12, 13. In the instant case the symbols 12, 13 are illuminated by two lighting elements 10. This allows for example illuminating the symbols in different colors. However, the lighting elements 10 are configured to have a light intensity and orientation so that they do not introduce a light intensity that is perceptible up to their border 6 in spite of coupling light into the inner pane 3. Their light intensity however is sufficient so that the structures in the shape of symbols i.e., the symbols 12 and 13 can be illuminated. The structures can be generated by gluing, etching, laser treatment, sand blasting of the inner pane 3. As an alternative, such a structures can also be realized in that the layer or foil 5 between the two panes 3, 4 is damaged locally in a targeted manner. This also results in locations of scattering for light which is coupled into the inner pane 3 at the interface to the foil 5 which site of scattering cause the corresponding symbols to light up. Such lit up structures can be in particular used for a warning function.

The warning function can generally be realized in that a control device checks a signal. When the signal satisfies a predetermined condition, the control device controls the lighting device provided therefore. The lighting device is constructed as described above.

Warning functions as mentioned above are particularly useful for driver assist systems. Thus, the above lighting device can for example be used for a "distance warner". The distance warner continuously checks whether a defined distance to the driver ahead is maintained. The check is carried out for example by radar. When a minimal distance is fallen below, the driver has to be warned in an appropriate manner. This can for example occur by means of the explained lighting device below the windshield at the dashboard or the like.

The lighting device according to the invention can also be used for a driver assist system "takeover warning system". In this case, for example a radar beam scans the rear region of a motor vehicle. When a takeover of the vehicle is detected and the own vehicle has set the blinker to the lane of the overtaking car or when a steering angle of the own vehicle in the direction toward the lane of the overtaking car is detected, a corresponding take over warning can be visually outputted. This occurs for example in that a running light at the inside of the door of on the side of the car taking over indicates a takeover maneuver. For example this can occur by means of a red running light, which moves forward in driving direction.

Further possible applications of the lighting device in a driver assist system could be the use in an "exiting assistant". When the vehicle stops for example adjacent a bicycle lane and an occupant intends to exit, a corresponding illumination of the door can indicate whether the door can be opened safely. When there is no danger the door can for example be illuminated in green on the inside while in case of danger i.e., for example in case of an approaching or passing bicycle it lights up in red.

Other driver assist systems can also be equipped with the lighting device according to the invention. The lighting device can be configured very large surfaced because It represents a high valued decorating element.

According to the invention it is thus possible to couple light into windows of a vehicle preferably into slidable windows such as side windows and to let the light exit at the edges so that not the entire window but only the edges light up. This allows for example increasing safety when the windows are moved down or in vehicles with frameless doors such as cabriolets or coupes to not hit ones head at the window. At the same time the double window is used to illuminate structures, which are arranged in an interior region and with this provide additional information, in particular warnings to a vehicle occupant.

The invention claimed is:

1. A window device for a motor vehicle comprising:
    a transparent first pane including a first structure for coupling out light;
    a transparent second pane connected in parallel with the first pane said second pane having a second structure for coupling out light; and
    a lighting device for coupling a first light into the first pane, wherein a second light can be coupled into the second pane independent of the first light.

2. The window device of claim 1, wherein with the lighting device the first light can be coupled into a front side of the first pane and the second light into a front side of the second pane.

3. The window device of claim 1, wherein the lighting device includes plural light sources and wherein the first light and the second light originate from respective different ones of the light sources of the lighting device.

4. The window device of claim 1, wherein the first structure for coupling out light is located on at least one front side of the first pane.

5. The window device of claim 1, wherein the second structure for coupling out light is located in a region of the second pane which region is different from the front side of the second pane.

6. The window device of claim 1, wherein the first and second structures for coupling out light are produced by at least one of gluing onto the first and/or second pane, etching of the first and/or second pane, laser treatment of the first and/or second pane and sand blasting of the first and/or second pane.

7. The window device of claim 1, further comprising a foil adhesively attached between the first and second panes.

8. The window device of claim 1, wherein the first and second panes are illuminated by the lighting device with different light intensities and/or light colors.

9. The window device of claim 1, wherein constructed for generating a visual indication.

10. The window device of claim 1, wherein the visual indication is a warning.

11. A motor vehicle comprising the driver assist system of claim 9.

* * * * *